United States Patent
Byun et al.

(10) Patent No.: US 12,042,094 B2
(45) Date of Patent: Jul. 23, 2024

(54) CONTROLLED POSITIONING IN FOOD PROCESSOR

(71) Applicant: SOCIETE DES PRODUITS NESTLE S.A., Vevey (CH)

(72) Inventors: Da Mi Byun, Lausanne (CH); Heinz Dercar, Vienna (AT); Bertrand Guyon, Pontarlier (FR); Christian Hoffmann, Boheimkirchen (AT); Marco Restelli, La Tour-de-Peilz (CH); Wolfgang Tuider, Oberwart (AT); Philipp Zavarsky, Pfaffstatten (AT)

(73) Assignee: Societe des Produits Nestle S.A., Vevey (CH)

( * ) Notice: Subject to any disclaimer, the term of this patent is extended or adjusted under 35 U.S.C. 154(b) by 922 days.

(21) Appl. No.: 17/042,289

(22) PCT Filed: Mar. 28, 2019

(86) PCT No.: PCT/EP2019/057843
§ 371 (c)(1),
(2) Date: Sep. 28, 2020

(87) PCT Pub. No.: WO2019/185784
PCT Pub. Date: Oct. 3, 2019

(65) Prior Publication Data
US 2021/0007554 A1 Jan. 14, 2021

(30) Foreign Application Priority Data
Mar. 29, 2018 (EP) .................................... 18164899

(51) Int. Cl.
*A47J 31/00* (2006.01)
*A47J 41/00* (2006.01)
*A47J 43/046* (2006.01)

(52) U.S. Cl.
CPC ......... *A47J 41/0061* (2013.01); *A47J 31/005* (2013.01); *A47J 43/046* (2013.01)

(58) Field of Classification Search
CPC ........ A47J 43/046; A47J 43/07; A47J 31/005; A47J 41/0061
(Continued)

(56) References Cited

U.S. PATENT DOCUMENTS 1,915,129 A 6/1933 Krause
5,632,194 A * 5/1997 Lin ..................... A47J 31/0615
99/305

(Continued)

FOREIGN PATENT DOCUMENTS

CN 102160761 8/2011
CN 103356085 A 10/2013
(Continued)

OTHER PUBLICATIONS

Japanese office action for appl No. 2020-546405 dated Apr. 4, 2023.
(Continued)

*Primary Examiner* — Reginald Alexander
(74) *Attorney, Agent, or Firm* — K&L Gates LLP

(57) ABSTRACT

A machine (1) for processing a liquid food substance includes: a jug (20) having a container (21) and delimiting a food cavity (21') for containing the liquid food substance; and a base (10) that has one or more walls (11) forming a seat (11') for removably receiving the container (21). The base (10) and the jug (20) comprise or delimit, respectively, an off-centred projecting member (33) and a corresponding off-centred seat (13) for the projecting member (33) or vice versa. The off-centred seat (13) is configured to receive the projecting member (33) when the container (21) is received by the base seat (11') such that the container (21) is in place for processing the liquid food substance. The off-centred (Continued)

projecting member (33) is configured to maintain the container (21) off its place for processing the liquid food substance in the cavity (21') when the projecting member (33) is off-set relative to the off-centred seat (13).

20 Claims, 4 Drawing Sheets

(58) Field of Classification Search
USPC .............................. 99/322, 323; 220/592.17
See application file for complete search history.

(56) References Cited

U.S. PATENT DOCUMENTS

| | | | | |
|---|---|---|---|---|
| 5,813,317 | A | * | 9/1998 | Chang ................. A47J 31/0605 |
| | | | | 99/305 |
| 5,947,004 | A | * | 9/1999 | Huang .................... A47J 31/02 |
| | | | | 99/322 |
| 2002/0027137 | A1 | * | 3/2002 | Price ................. A47G 19/2272 |
| | | | | 220/23.91 |
| 2015/0157163 | A1 | * | 6/2015 | Lin ......................... A47J 31/02 |
| | | | | 99/322 |

FOREIGN PATENT DOCUMENTS

| | | |
|---|---|---|
| CN | 107713715 A | 2/2018 |
| CN | 206995135 U | 2/2018 |
| DE | 102012104321 | 11/2013 |
| JP | H06113960 A | 4/1994 |
| JP | H0975240 A | 3/1997 |
| JP | 2008278957 A | 11/2008 |
| JP | 2021517012 A | 7/2021 |
| WO | 2009097705 | 8/2009 |
| WO | 2011090370 | 7/2011 |
| WO | 2011153587 A1 | 12/2011 |
| WO | 2016202816 A1 | 12/2016 |
| WO | 2017216133 | 12/2017 |

OTHER PUBLICATIONS

Chinese Office Action for Appl No. 201980016973.5 dated Dec. 29, 2023.

* cited by examiner

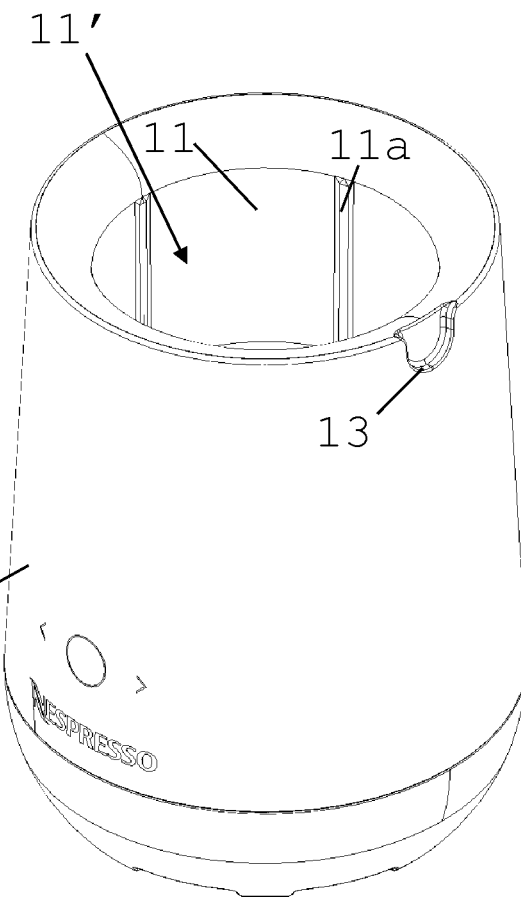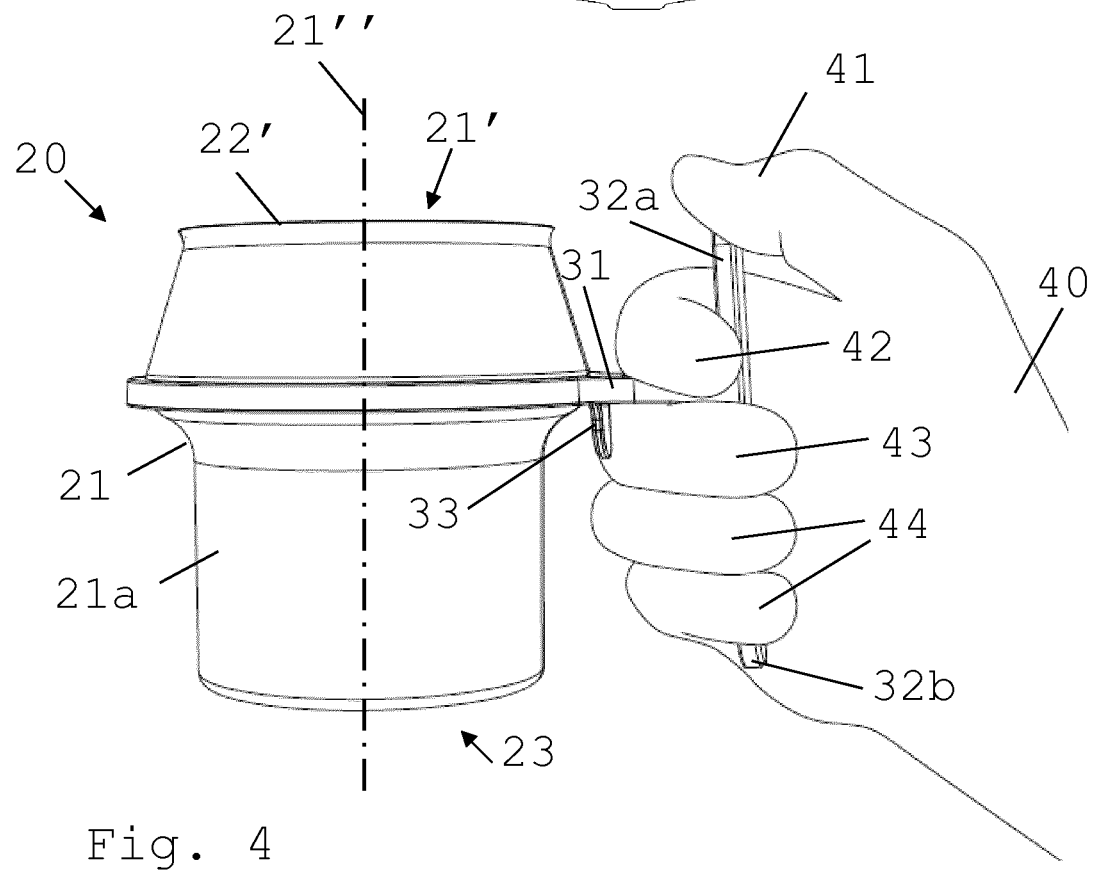

CONTROLLED POSITIONING IN FOOD PROCESSOR

CROSS REFERENCE TO RELATED APPLICATIONS

The present application is a National Stage of International Application No. PCT/EP2019/057843, filed on Mar. 28, 2019, which claims priority to European Patent Application No. 18164899.9, filed on Mar. 29, 2018, the entire contents of which are being incorporated herein by reference.

FIELD OF THE INVENTION

The field of the invention pertains to machines for processing a food substance, such as milk or a milk-containing substance, having a removable food processing jug. For instance, the machine is provided with an impeller and/or a thermal management arrangement.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

Milk-based froth can be prepared in a mechanical stirring appliance. Regular cleaning of the tank of the appliance needs to be envisaged in order to remove any solid food residue. In addition, heating the milk has a tendency to increase the extent to which cooked or burnt proteins are deposited on and adhere to the surfaces.

U.S. Pat. No. 6,318,247 relates to an appliance for preparing hot beverages or food with stirring such as hot chocolate, for example. Other devices for stirring food products are described in patent documents WO 2004/043213 or DE 196 24 648. Stirring systems with a magnetic engagement type are described in documents U.S. Pat. No. 2,932,493, DE 1 131 372, U.S. Pat. Nos. 4,537,332 and 6,712,497. DE 89 15 094 relates to a refrigerated pot for dispensing a milk-based beverage. U.S. Pat. No. 3,356,349 discloses a stirring device that has a heated tank, magnetic drive means positioned under the tank for driving a hub located in the middle of the tank.

Further examples of beverage processing appliances using stirring systems, in particular magnetically driven stirring systems, are disclosed in WO 2016/202814, WO 2016/202815, WO 2016/202816, WO 2016/202817, PCT/EP17/082208 and PCT/EP17/082211.

An improved appliance for preparing froth from a milk-based liquid or milk has been proposed in WO 2006/050900, WO 2008/142154, WO 2011/039222, WO 2011/039224 and WO 2017/216133. The device has: an inner tank for receiving the liquid that is to be frothed, in which a rotatable stirrer is positioned; an outer stand holding the tank; drive and control means which are in a cavity located between the inner tank and the outer stand, and which communicate with a switch and electrical connections located on the outer surface of the stand; and disturbance means to optimise circulation of the milk during frothing. In WO 2010/023313 a steam source is associated with the stirring effect.

Heat can be provided into the processing tank by using an induction system, e.g. as disclosed in EP2017203199.

More recently, it has been proposed, as described in WO 2009/074555 and WO 2011/144647, to provide a coffee machine with this type of milk conditioning tank.

An architecture to favour the evacuation of unwanted heat generated by the operation of electric components of the milk frothing appliance has been disclosed in WO 2016/202818. As disclosed in PCT/EP17/082212 and EP2017203205, such appliance can also be fitted with one or more fan coolers.

There is still a need to improve the control of such appliances, for instance when the appliance is incorrectly operated by a user.

SUMMARY OF THE INVENTION

It is a preferred object of the present invention to provide a machine for conditioning a food substance with a fool proof arrangement.

It is another preferred object of the present invention to provide a machine with a stable assembly of a food processing container on an active base.

The invention thus relates to a machine for processing a liquid food substance, such as milk or a milk-based substance. The liquid food substance can be aqueous, e.g. containing coffee and/or chocolate and/or cacao.

The machine may be a standalone machine, e.g. directly pluggable to the mains via an electric cord, or may be integrated in a food processor arranged to process other food items or to carry out different food conditioning processes, the food processor itself being generally pluggable to the mains via an electric cord whereas the machine is a sub-part of the food processor. Such a food processor may be a beverage maker, such as a coffee maker, e.g. a beverage maker configured to prepare a beverage (such as coffee) from an ingredient capsule.

The machine of the invention may advantageously be configured to froth and/or heat and/or cool milk and optionally be associated, as a standalone machine or as an integrated machine, into a coffee maker. Standalone machines and integrated associations of milk frothing machines and coffee makers are for example disclosed in WO 2006/050900, WO 2008/142154, WO 2009/074555, WO 2010/023312 and WO 2010/023313.

Hence, the machine can be a milk frother which operates by incorporating finely divided gas bubbles, e.g. air bubbles, into milk. When the machine is configured for incorporating gas bubbles into milk, it may include an operating mode without incorporation of gas bubbles.

The machine of the invention is configured for processing a liquid food substance, such as milk or a milk-based substance.

The machine includes a jug having a container that delimits a food cavity for containing the liquid food substance. The container can have a removable lid for covering the cavity, e.g. as taught in WO 2008/142154.

The container can be substantially cup-shaped or bowl-shaped or cylinder-shaped, the sidewall being substantially upright and the bottom wall being substantially flat or curved.

The jug may be mechanically passive. Hence, beyond the inherent mechanical properties of the materials making its structure for containing the food substance and for being integrated or assembled in the machine, the jug may be free of any mechanically active part such as a motor or movement transformation system which may require special care for hygiene or cleaning purposes. The jug may contain one or more mechanically passive movable parts, such as a whisk or stirrer or ingredient basket in the container, that is/are driven from outside the jug.

The jug may be electrically passive. Hence, beyond the inherent electrical properties (e.g. resistive and/or inductive and/or capacitive properties) of the materials making its structure for containing the food substance and for being integratable or assembled in the machine, the jug may be free of any electric components, in particular active electric components. The inherent electrical properties of the jug may however be used in the processing of the food substance, for instance for heating and/or cooling the jug that is powered electrically or electromagnetically from an (active) source that is external to the jug.

By providing a jug which is mechanically and/or electrically passive (optionally with a lid that is equally passive), it can easily be cleaned, e.g. in a dishwater, without any risk of damaging electric and/or mechanic components.

The same result can be achieved when the jug is provided with a control cavity, e.g. containing mechanical and/or electric control active constituents such as actuators and signal processing units, which cavity has no movable access panel sealed off by a rubber, silicone or like seal that is exposed to early wear, especially when exposed to detergents or soaps used for cleaning. Hence, the same result may be achieved, if the jug contains active components that are contained in an inaccessible confinement cavity, the jug being for instance entirely moulded and/or welded around such a confinement cavity so that the cavity is completely sunk in the jug's structure and separate from the environment outside the jug with no access from the outside without destroying the jug. In such circumstances, the jug may contain in such confined inaccessible cavity an active device, e.g. an RFID-type device or the like.

The machine includes a base that has one or more walls forming a seat for removably receiving the container.

The base may have a powered cavity, e.g. a cavity powered by the mains via an electric cord, that is adjacent the container. The base cavity may include a thermal conditioner for generating heat in the food cavity (heating the cavity) and/or for removing heat from the food cavity (cooling the cavity). The base cavity may include an actuator, e.g. a motor, for driving the liquid food substance in the container.

Actuators e.g. motors, control units, user-interfaces, AC/DC converters can all be comprised in the base, e.g. in the powered cavity.

The base and the jug comprise or delimit, respectively, an off-centred, e.g. peripheral, projecting member, typically a pin or blade, and a corresponding off-centred, e.g. peripheral, seat for the projecting member or vice versa. The off-centred seat is configured to receive the projecting member when the container is received by the base seat such that the container is in place for processing the liquid food substance in the food cavity. The off-centred projecting member is configured to maintain the container off its place for processing the liquid food substance in the cavity when the projecting member is off-set, e.g. angularly off-set, relative to the off-centred seat.

In this context, "off-centre" means off (or away from) a central upright or vertical axis of the food cavity delimited by the container of the jug.

The jug may include the off-centred projecting member and the base delimiting the off-centred seat or vice versa. For example, an outside face of the base delimits the off-centred seat.

Hence, to ensure proper position of the jug on or in the base, cooperating off-centred member and seat can be used in a simple manner to discriminate mechanically between an improper positioning and a proper positioning.

The cooperating off-centred member and seat, may be used to prevent relative movement of the jug and seat during the processing of the liquid food substance.

The cooperating off-centred member and seat can also be used to detect automatically a misplacement of the jug and seat such that the processing of the liquid food substance is not possible or sub-optimal.

For example, such a misplacement may be detected automatically by using a sensor for sensing the presence (or absence) of the off-centred member in the cooperating seat. However, under certain conditions, such a sensor is not required to detect automatically a misplacement, for example as exposed in the embodiments below.

When the off-centred projecting member is received in the off-centred seat, the off-centred seat and the off-centred projecting member can have at least one of:
  complementary shapes so that the off-centred seat and the off-centred projecting member form together a continuous outside surface;
  a configuration to prevent a rotation of the container relative to the base; and
  a configuration such that a downwardly oriented edge of the container rests on an upwardly oriented edge of the base or such that the container edge is distant to the base edge by no more than 0.5 mm, the base edge forming for instance a rim of the base seat for receiving the container.

When the off-centred projecting member is off-set relative to the off-centred seat, a or the above downwardly oriented edge of the container may be spaced apart from a or the above upwardly oriented edge of the base, such as a base edge forming a rim of the base seat for receiving the container, by a distance that is greater than when the off-centred projecting member is received in the off-centred seat, such as greater by a distance corresponding to a height of a portion of the off-centred projecting member that is housed in the off-centred seat of the base when the off-centred projecting member is received in the off-centred seat, such as a height in the range of 0.3 to 5 cm, e.g. 0.5 to 2.5 cm.

The machine may include a processing device and a control system that is configured to control the processing device, such as an actuator and/or a thermal conditioner controlled by a control unit, for processing the liquid food substance. The control system may be configured to detect when the container is off its processing place, for instance when the off-centred member is off-set relative to the off-centred seat, by measuring a characteristic, e.g. a current consumption and/or a voltage consumption and/or an electric frequency, of the processing device and comparing such measured characteristic to an expected value thereof when the container is in its processing place or off its processing place. The control system may be configured to prevent processing of the liquid food substance and/or generate an error message or alarm, when the control system detects that the container is off its processing place.

For example, the processing device and/or the control system are contained in the base.

The jug can have a handle for holding the jug by an adult human hand. The handle may have a connection member projecting from the container and a substantially elongated upright gripping member that is connected to the connection member at a distance from the container. The gripping member can have an upper portion that is above the connection member and a lower portion that is below the connection member. The upper portion may be configured to support a thumb of the hand and delimit with the connection member an upper seat for accommodating an index finger of the hand when the handle is held by the hand.

The connection member may be horizontal or at an angle of less than 30 deg thereto, such as less than 15 deg. thereto, when the jug is oriented for processing the liquid food substance.

The upright gripping member can extend vertically or at an angle of less than 30 deg thereto, such as less than 15 deg. thereto.

The cavity of the container may extend to above the connection member by a height in the range of 1 to 7 cm, such as from 2 to 5 cm, e.g. from 3 to 4 cm.

The handle can have a confinement member that extends: substantially uprightly between the container and the lower portion of the gripping member; and downwardly from the connection member or from close thereto. For instance, the confinement member may be spaced (if at all) from the connection member by a distance of less than 5 mm.

The confinement member and the lower portion and the connection member may delimit a lower seat for accommodating a portion of a middle finger of the hand when the handle is held by the hand.

Hence, such a handle configuration may be used to safely secure the handle (and the jug) between the inner side of the hand's thumb (pushing the handle's upper portion towards the container), the inner side of a hand's first finger below the thumb (e.g. the index finger pulling the handle's upper portion away from the container) and the rear and lateral sides of a hand's second finger (e.g. the hand's middle finger resting against the confinement member towards the container and supporting the connection member). In such a holding configuration, the jug is held by the second finger and locked in position by the thumb and the first finger in an ergonomic manner. The remaining fingers, e.g. the annular and the little fingers, are not even required for holding or securing the jug in the user's hand. If the lower portion of the gripping member is long enough, these remaining fingers may seize it to assist the holding. However, such a contribution by the remaining fingers is optional.

The confinement member may be used to reduce the risk that the hand comes into contact with heated or cooled parts of the container, for instance when the container is heated above 40° C. or 50° C. or cooled down below 10° C. or 5° C. The confinement member may thus be spaced from the container and/or made of thermally insulating material, e.g. a ceramic and/or a polymer.

The off-centred projecting member can be formed by the confinement member or vice versa.

The upper part of the gripping member may have at least one of the following features: the upper part can be spaced from the container by a distance in the range of 1.5 to 4 cm, such as 2 to 3 cm; The upper part may extend above the connection member by a distance in the range of 1 to 3 cm, such as 1.5 to 2.5 cm; the upper part of the gripping member can have a width in the range of 0.5 to 3 cm, such as 1 to 2 cm; and the upper part may have an uppermost free end.

The lower part of the gripping member may have at least one of the following features: the lower part may be is spaced from the container by a distance in the range of 1.5 to 4 cm, such as 2 to 3 cm; the lower part may extend below the connection member by a distance in the range of 1 to 5 cm, such as 2.5 to 4.5 cm; the lower part of the gripping member can have a width in the range of 0.5 to 3 cm, such as 1 to 2 cm; and the lower part may have a lowermost free end.

The confinement member can have at least one of following features: the confinement member may be spaced by a distance to the lower part of the gripping part in the range of 1.5 to 3 cm, such as 2 to 2.5 cm; the confinement member can have a lowermost end that is spaced by a distance to the connection member in the range of 0.5 to 5 cm such as 1 to 3 cm, e.g. 1.5 to 2.5 cm; the confinement member may have a width in the range of 0.5 to 3 cm, such as 1 to 2 cm; and the confinement member can have a lowermost free end.

The container may have a rim delimiting an opening of the container cavity, the removable lid extending over the rim.

The removable lid can have a peripheral wall that extends downwardly to form an outside lid face of the container.

The outside lid face may have a height in the range of 0.5 to 5 cm e.g. in the range of 1.5 to 3.5 cm.

The outside lid face may extend flush with an outside face of the container uncovered by the lid and/or with an outside face of the base.

The removable lid can have an upright inner wall that extends downwardly into the cavity along the rim.

The peripheral wall and/or the upright inner wall may have having a sealing member, such as an annular deformable sealing member, for sealing off the cavity.

The sealing member may have one or more substantially parallel sealing lips, such as annular lips arranged side-by-side.

The sealing member may have a tab for seizing the sealing member.

The sealing member may be removable from the lid, for instance for cleaning, and mountable on the lid.

The removable lid can have a or the above peripheral wall that has a bottom end that contacts or comes close to the connection member, the bottom end being for example spaced by less than 1 cm, such as less than 0.5 cm, from the connection member.

The container may have at least one outside container wall that can be thermally conditioned by the liquid food substance in the cavity and/or by processing the liquid food substance in the cavity and that faces the base wall(s) when the container is in or on the base seat. The base and/or the container can include one or more thermally insulating spacers, such as ribs or protrusions or an insulating layer, spacing the base wall(s) from the container wall(s) when the container is received in or on the seat so as to prevent or inhibit thermal transfer between the base wall(s) and the container wall(s).

Hence, by providing the spacers, energy transfer between the base and the container can be effectively prevented or at least inhibited.

Such insulating spacer may be made of insulating material, such as a ceramic or polymer material, and/or the spacer may have an insulating shape, e.g. provided with a small cross-section orthogonal to the thermal flux between the container and the base.

The container may include a thermally radiating or absorbing element, such as an electrically resistive element or a thermocouple element.

The outside thermally radiating or absorbing element may have a total outside surface facing the base wall(s), whereby less than 15%, such as less than 10%, for example less than 5%, e.g. less than 3%, of the total outside surface contacts or forms the thermally insulating spacers.

The thermally radiating or absorbing element can be powered by the base by electric conduction and/or electromagnetic induction.

The energy may be passed electrically from the base to the jug by respective electric connectors that are electrically connected when the container is in the base seat.

The energy may be passed inductively from the base to the jug by an induction generation device in the base and by an induction receiver in the jug, e.g. walls of the container.

The container can be configured to radiate heat to outside of the container or absorb heat from outside of the container predominantly via one or more preferential container walls, as the above thermally radiating or absorbing element, when the liquid food substance is processed in the container received in or on the seat. The thermally insulating spacers can be positioned so as to space the preferential wall(s) from the base wall(s). The preferential container wall(s) may form a bottom wall of the container or a sidewall of the container or both.

The or each insulating spacer may be configured to space the corresponding base wall from the container wall by a distance in the range of 0.1 to 1 cm, such as 0.3 to 0.8 e.g. 0.4 to 0.7 cm.

The food cavity can contain a movable agitating device, such as a whisk and/or a stirrer, to agitate the liquid food substance during its processing.

The agitating element can be driven by a or the above actuator that is contained in the base and that is coupled, for instance magnetically, to the agitating device via a container wall such as a bottom wall of the container.

The agitating element may be configured to foam in the food cavity milk or a milk-based liquid as the liquid food when driven by the a or the above actuator.

The agitating device may be an impeller. The impeller may have a spring-like structure of the type disclosed in WO 2006/050900 or in WO 2008/142154 and/or the impeller can have a wavy and/or open disc-shaped structure as taught in WO 2016/202817.

The impeller can have a foot for being coupled to the actuator, e.g. via magnetic elements in the foot.

A magnetic coupling of the impeller, e.g. of a low inertia impeller, can be achieved as taught in WO 2006/050900 or in WO 2008/142154.

The magnetic coupling of the impeller, e.g. of a high inertia impeller, may be achieved as taught in WO 2016/202814 or PCT/EP17/082211.

When a high transmission torque is transmitted to the impeller via a magnetic coupling (i.e. a strong coupling), a magnetic uncoupling arrangement may be provided, e.g. as taught in WO 2016/202815.

Suitable impellers and their implementation into the machine are disclosed in WO 2016/202814, WO 2016/202815, WO 2016/202816 and WO 2016/202817 as well as PCT/EP17/082208 and PCT/EP17/082211.

The container can be provided with a thermally insulating outside material and/or with a handle, for seizure and optional displacement of the container by a human hand. Such a configuration is particularly advantageous when the food is processed at a higher temperature exceeding e.g. 50° C. or at lower temperature below 10° C.

When reference is made in the present description to an orientation or position relative to the machine or parts thereof, e.g. "above" or "below" or "vertical" or "horizontal", the orientation or position takes as a reference the position and orientation of the machine in operation to process the liquid food substance in the container unless specified otherwise.

BRIEF DESCRIPTION OF THE DRAWINGS

The invention will now be described with reference to the schematic drawings, wherein:

FIG. 3 shows a perspective view from above of the base of the machine of FIG. 1;

FIG. 4 shows a perspective side view of the jug of the machine of FIG. 1 when held single-handed;

DETAILED DESCRIPTION

Figure 1:
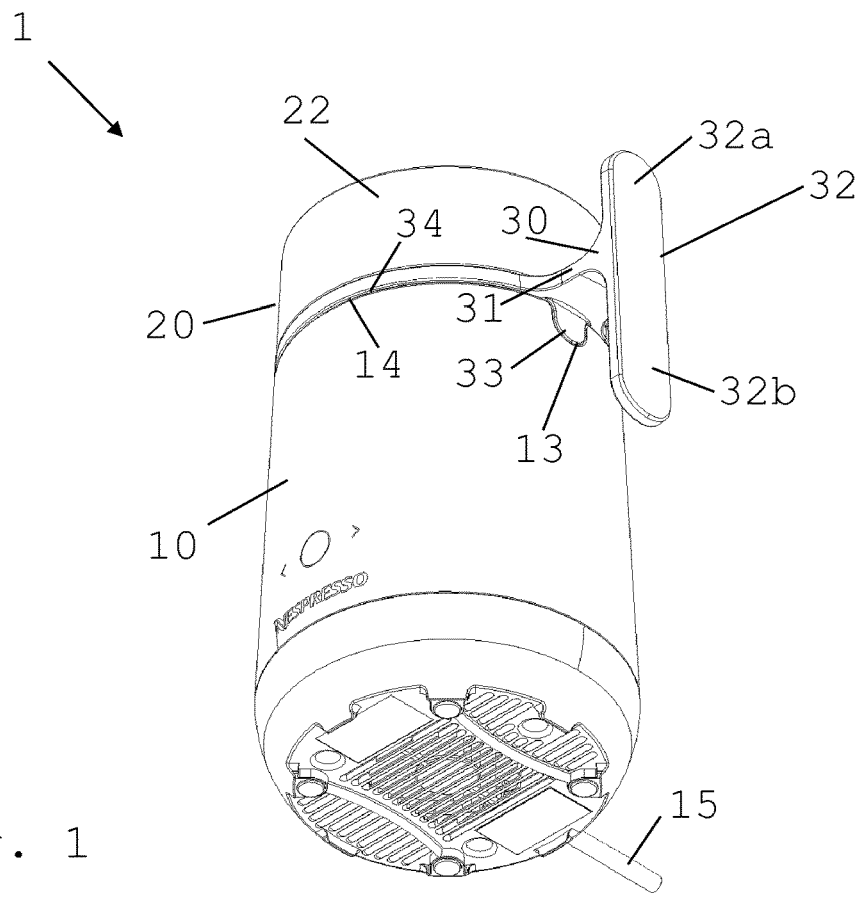
FIG. 1 is a perspective view from below of a machine according to the invention.

An exemplary embodiment of a machine 1 according to the invention and parts thereof are illustrated in FIGS. 1 to 6.

Machine 1 is configured for processing a liquid food substance, such as milk or a milk-based substance.

Machine 1 includes a jug 20 having a container 21 that delimits a food cavity 21' for containing the liquid food substance. Container 21 may have a removable lid 22 for covering cavity 21'.

Machine 1 incorporates a base 10 that has one or more walls 11 forming a seat 11' for removably receiving container 21.

Figure 2:
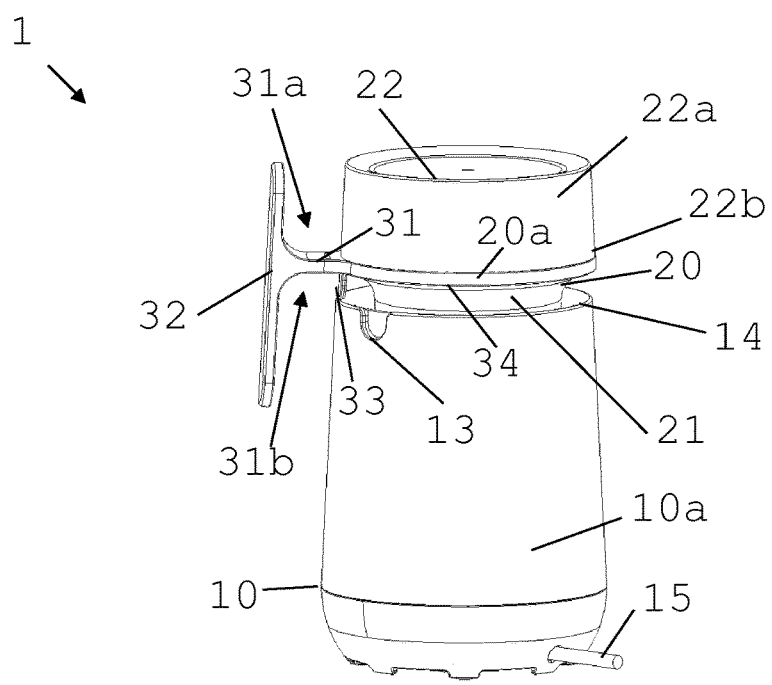
FIG. 2 is a perspective side view of the machine of FIG. 1 in which the container is off-set relative to the base.

As illustrated in FIGS. 1 and 2, base 10 and jug 20 comprise or delimit, respectively, an off-centred, e.g. peripheral, projecting member 33, typically a pin or blade, and a corresponding off-centred, e.g. peripheral, seat 13 for projecting member 33 or vice versa. Off-centred seat 13 is configured to receive projecting member 33 when container 21 is received by base seat 11' such that container 21 is in place for processing the liquid food substance in food cavity 21'. Off-centred projecting member 33 is configured to maintain container 21 off its place for processing the liquid food substance in cavity 21' when projecting member 33 is off-set, e.g. angularly off-set, relative to off-centred seat 13.

Hence, off-centred peripheral projecting member 33 and corresponding off-centred seat 13 are normally both away from a central upright or vertical axis 21" of food cavity 21' of container 20.

Jug 20 may comprise off-centred projecting member 33 and base 10 may delimit off-centred seat 13 or vice versa. An outside face 10a of base 10 may delimit off-centred seat 13.

When off-centred projecting member 33 is received in off-centred seat 13, off-centred seat 13 and off-centred projecting member 33 can have at least one of: complementary shapes so that off-centred seat 13 and off-centred projecting member 33 form together a continuous outside surface; a configuration to prevent a rotation of container 21 relative to base 10; and a configuration such that a downwardly oriented edge 34 of container 21 rests on an upwardly oriented edge 14 of base 10 or such that container edge 34 is distant to base edge 14 by no more than 0.5 mm, base edge 14 forming for instance a rim of base seat 11 for receiving container 21.

When off-centred projecting member 33 is off-set relative to off-centred seat 13, a or the above downwardly oriented edge 34 of container 21 can be spaced apart from a or the above upwardly oriented edge 14 of base 10, such as a base edge 14 forming a rim of base seat 11 for receiving container 21, by a distance that is greater than when off-centred projecting member 33 is received in off-centred seat 13, such as greater by a distance corresponding to a height of a portion of off-centred projecting member 33 that is housed in off-centred seat 13 of base 10 when off-centred projecting member 33 is received in off-centred seat 13, such as a height in the range of 0.3 to 5 cm, e.g. 0.5 to 2.5 cm.

Figure 7:
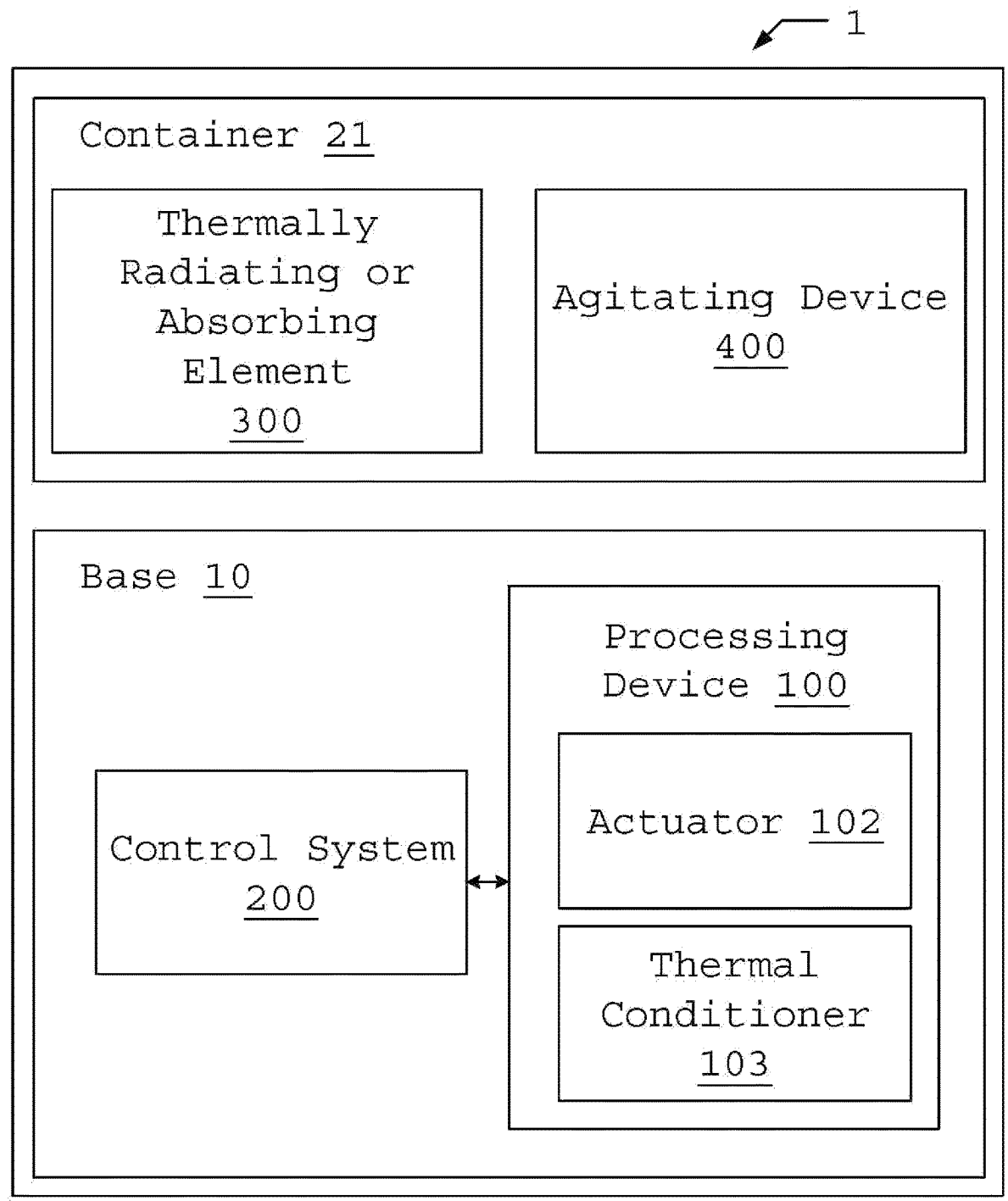
FIG. 7 shows a block diagram of the machine according to the present invention.

As shown in FIG. 7, machine 1 may include a processing device 100 and a control system 200 that is configured to control the processing device 100, such as an actuator 102 and/or a thermal conditioner 104 controlled by a control unit, for processing the liquid food substance. The control system 200 can be configured to detect when container 21 is off its processing place, for instance when off-centred member 33 is off-set relative to off-centred seat 13, by measuring a characteristic, e.g. a current consumption and/or a voltage consumption and/or an electric frequency, of the processing device 100 and comparing such measured characteristic to an expected value thereof when container 21 is in its processing place or off its processing place. For example, the processing device 100 and/or the control system 200 are contained in base 10.

Jug 20 may have a handle 31,32,33 for holding jug by an adult human hand 40, handle 31,32,33 having a connection member 31 projecting from container 21 and a substantially elongated upright gripping member 32 that is connected to connection member 31 at a distance from the container 21. Gripping member 32 may have an upper portion 32a that is above connection member 31 and a lower portion 32b that is below connection member 31. Upper portion 32a can be configured to support a thumb 41 of hand 40 and delimit with connection member 31 an upper seat 31a for accommodating an index finger 42 of hand 40 when handle 31,32,33 is held by hand 40.

Connection member 31 can be horizontal or at an angle of less than 30 deg thereto, such as less than 15 deg. thereto, when jug 20 is oriented for processing the liquid food substance.

Upright gripping member 32 may extend vertically or at an angle of less than 30 deg thereto, such as less than 15 deg. thereto.

Cavity 21' of container 21 may extend to above connection member 31 by a height in the range of 1 to 7 cm, such as from 2 to 5 cm, e.g. from 3 to 4 cm.

Handle 31,32,33 may have a confinement member 33 that extends: substantially uprightly between container 21 and lower portion 32b of gripping member 32; and downwardly from connection member 31 or from close thereto.

Confinement member 33 and lower portion 32b and connection member 31 may delimiting a lower seat 31b for accommodating a portion of a middle finger 43 of hand 40 when handle 31,32,33 is held by hand 40.

As illustrated in FIG. 4, such a handle configuration may be used to safely secure handle 31,32,33 between the inner side of the hand's thumb 41 (pushing in a direction 41a the handle's upper portion 32a towards container 21), the inner side of a hand's first finger 42 below the thumb 41 (e.g. the index finger 42 pulling in a direction 42a the handle's upper portion 32a away from container 21) and the rear and lateral sides of a hand's second finger 43 (e.g. the hand's middle finger 43 resting against confinement member 33 towards container 21 and supporting connection member 31 in a direction 43a). In such a holding configuration, jug 20 is held by second finger 43 and locked in position by thumb 41 and first finger 42 in an ergonomic manner. The remaining fingers 44, e.g. the annular and the little fingers 44, are not even required for holding or securing jug 20 in the user's hand. If the lower portion 32a of the gripping member 32 is long enough, these remaining fingers 44 may seize it to assist the holding (in a direction 44a). However, such a contribution by the remaining fingers is optional.

Off-centred projecting member 33 may be formed by confinement member 33 or vice versa.

Upper part 32a may be spaced from container 21 by a distance in the range of 1.5 to 4 cm, such as 2 to 3 cm.

Upper part 32a can extend above connection member 31 by a distance in the range of 1 to 3 cm, such as 1.5 to 2.5 cm.

Upper part 32a of gripping member 32 can have a width in the range of 0.5 to 3 cm, such as 1 to 2 cm.

Upper part 32a may have an uppermost free end.

Lower part 32b may be spaced from container 21 by a distance in the range of 1.5 to 4 cm, such as 2 to 3 cm.

Lower part 32b can extend below connection member 31 by a distance in the range of 1 to 5 cm, such as 2.5 to 4.5 cm.

Lower part 32b of gripping member 32 may have a width in the range of 0.5 to 3 cm, such as 1 to 2 cm.

Lower part 32b can have a lowermost free end.

Confinement member 33 can be spaced by a distance to lower part 32b of gripping part 32 in the range of 1.5 to 3 cm, such as 2 to 2.5 cm.

Confinement member 33 may have a lowermost end that is spaced by a distance to connection member 31 in the range of 0.5 to 5 cm such as 1 to 3 cm, e.g. 1.5 to 2.5 cm.

Confinement member 33 can have a width in the range of 0.5 to 3 cm, such as 1 to 2 cm.

Confinement member 33 may have a lowermost free end.

As illustrated in FIG. 4, container 20 can have a rim 22' delimiting an opening of container cavity 21'. Removable lid 22 may extend over the rim 22', as illustrated in FIGS. 1 and 2.

Figure 5:
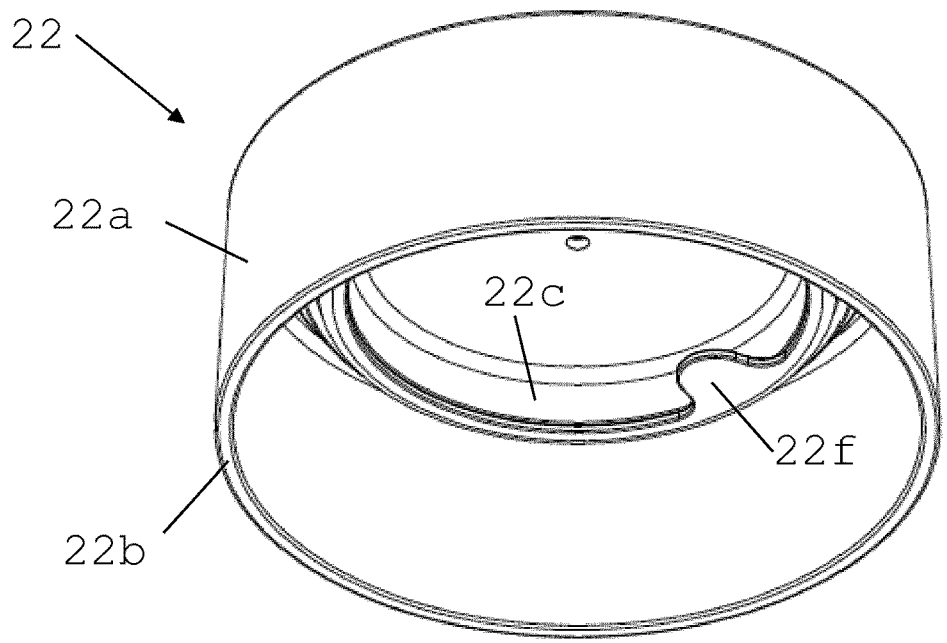
FIG. 5 is a perspective view from below of a lid of the jug of the machine of FIG. 1.
Figure 6:
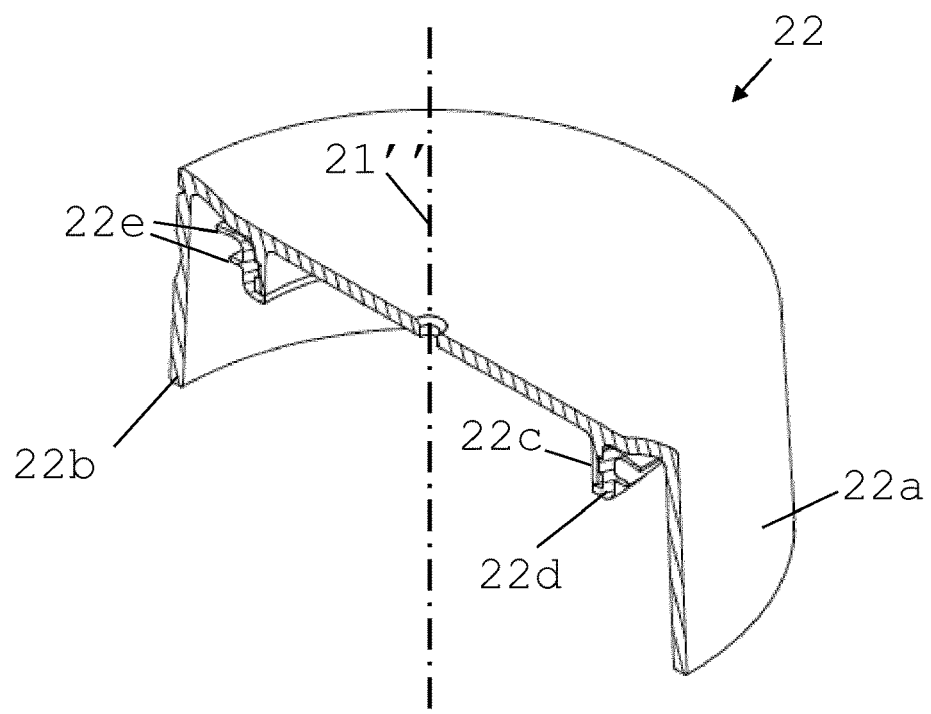
FIG. 6 shows a perspective view from above of the lid of FIG. 5, part of which being cut away.

As illustrated in FIGS. 1, 5 and 6, removable lid 22 can have a peripheral wall 22a that extends downwardly to form an outside lid face of container 21, such as an outside lid face: having a height in the range of 0.5 to 5 cm e.g. in the range of 1.5 to 3.5 cm; and/or extending flush with an outside face 20a of container 21 uncovered by lid 22 and/or with an outside face 10a of base 10.

Removable lid 22 can have an upright inner wall 22c that extends downwardly into cavity 21' along rim 22'.

Peripheral wall 22a and/or upright inner wall 22c may have a sealing member 22d, such as an annular deformable sealing member, for sealing off cavity 21'.

Sealing member 22d can have one or more substantially parallel sealing lips 22e, such as annular lips arranged side-by-side.

Sealing member 22d may have a tab 22f for seizing sealing member 22e.

Sealing member 22d can be removable from lid 22, for instance for cleaning, and mountable on the lid.

Removable lid 22 may have a or the above peripheral wall 22a that has a bottom end 22b that contacts or comes close to connection member 31. Bottom end 22b may be spaced by less than 1 cm, such as less than 0.5 cm, from connection member 31.

Container 21 may have at least one outside container wall 21a that can be thermally conditioned by the liquid food substance in cavity 21' and/or by processing the liquid food substance in cavity 21' and that faces base wall(s) 11 when container 21 is in or on base seat 11'. As illustrated in FIG. 3, base 10 and/or container 21 may include one or more thermally insulating spacers 11a, such as ribs or protrusions or an insulating layer, spacing base wall(s) 11 from container wall(s) 21a when container 21 is received in or on seat 11' so as to prevent or inhibit thermal transfer between base wall(s) 11 and container wall(s) 21a. As depicted in FIG. 7, container 21 may include a thermally radiating or absorbing element 300, such as an electrically resistive element or a thermocouple element. For example, the thermally radiating or absorbing element 300 is powered by base 10 by electric conduction and/or electromagnetic induction.

Container 21 can be configured to radiate heat to outside of container 21 or absorb heat from outside of container 21 predominantly via one or more preferential container walls 21a, as the above thermally radiating or absorbing element, when the liquid food substance is processed in container 21 received in or on seat 11'. Thermally insulating spacers 11a may be positioned so as to space preferential wall(s) 21a from base wall(s) 11. For example, preferential container wall(s) 21a form a bottom wall 23 of container 21 or a sidewall of container 21 or both.

The or each insulating spacer 11a may be configured to space the corresponding base wall 11 from container wall 21a by a distance in the range of 0.1 to 1 cm, such as 0.3 to 0.8 e.g. 0.4 to 0.7 cm.

Base 10 may have a powered cavity, e.g. a cavity powered by the mains via an electric cord 15, that is adjacent container 21. The base cavity may include a thermal conditioner 103 for generating heat in food cavity 21' (heating the cavity) and/or for removing heat from food cavity 21' (cooling the cavity).

Food cavity 21' may contain a movable agitating device 300, such as a whisk and/or a stirrer, to agitate the liquid food substance during its processing.

The agitating element 400 may be driven by a or the above actuator 102 that is contained in base 10 and that is coupled, for instance magnetically, to the agitating device 400 via a container wall such as a bottom wall 23 of container 21.

The agitating element 400 can be configured to foam in food cavity 21' milk or a milk-based liquid as the liquid food when driven by the a or the above actuator 102.

The invention claimed is:

1. A machine for processing a liquid food substance, comprising:
   a container that delimits a food cavity for containing the liquid food substance;
   a base that has one or more walls forming a seat for removably receiving the container; and
   the base and the container comprise, respectively, an off-centered, projecting member, and a corresponding off-centered seat for the projecting member or vice versa, the off-centered seat being configured to receive the projecting member when the container is received by the base such that the container is in a place for processing the liquid food substance in the food cavity, the off-centered projecting member being configured to maintain the container off the place for processing the liquid food substance in the cavity when the projecting member is off-set, relative to the off-centered seat,
   wherein the machine further comprises a processing device and a control system that is configured to control the processing device for processing the liquid food substance, the control system being configured to detect when the container is off the processing place by measuring a characteristic of the processing device and comparing the characteristic to an expected value when the container is in the processing place or off the processing place.

2. The machine of claim 1, wherein, when the off-centered projecting member is received in the off-centered seat, the off-centered seat and the off-centered projecting member have at least one of:
   complementary shapes so that the off-centered seat and the off-centered projecting member form together a continuous outside surface;
   a configuration to prevent a rotation of the container relative to the base; and
   a configuration such that a downwardly oriented edge of the container rests on an upwardly oriented edge of the base or such that the downwardly oriented edge of the container is distant to the upwardly oriented edge of the base by no more than 0.5 mm, the upwardly oriented edge of the base forming a rim of the seat for receiving the container.

3. The machine of claim 1, wherein, when the off-centered projecting member is off-set relative to the off-centered seat, a downwardly oriented edge of the container is spaced apart from an upwardly oriented edge of the base, by a distance that is greater than when the off-centered projecting member is received in the off-centered seat.

4. The machine of claim 1, wherein:
   the processing device and the control system form an actuator and/or a thermal conditioner controlled by a control unit; and/or
   the control system is configured to detect when the container is off the processing place when the off-centered member is off-set relative to the off-centered seat; and/or
   the control system is configured to detect that the container is off the processing place by measuring the characteristic in the form of a current consumption and/or a voltage consumption and/or an electric frequency.

5. The machine of claim 1, wherein the container has a handle for holding the container by an adult human hand, the handle having a connection member projecting from the container and a substantially elongated upright gripping member that is connected to the connection member at a distance from the container, the gripping member having an upper portion that is above the connection member and a lower portion that is below the connection member, the upper portion being configured to support a thumb of the hand and delimiting with the connection member an upper seat for accommodating an index finger of the hand when the handle is held by the hand.

6. The machine of claim 5, wherein the handle has a confinement member that extends:
   substantially uprightly between the container and the lower portion of the gripping member; and
   downwardly from the connection member or from close thereto,
   the confinement member and the lower portion and the connection member delimiting a lower seat for accommodating a portion of a middle finger of the hand when the handle is held by the hand.

7. The machine of claim 5, wherein the upper portion of the gripping member has at least one of the following features:
   the upper portion is spaced from the container by a distance in the range of 1.5 to 4 cm;
   the upper portion extends above the connection member by a distance in the range of 1 to 3 cm;
   the upper portion of the gripping member has a width in the range of 0.5 to 3 cm; and
   the upper portion has an uppermost free end.

8. The machine of claim 5, wherein the lower part of the gripping member has at least one of the following features:
the lower portion is spaced from the container by a distance in the range of 1.5 to 4 cm;
the lower part extends below the connection member by a distance in the range of 1 to 5 cm;
the lower portion of the gripping member has a width in the range of 0.5 to 3 cm; and
the lower portion has a lowermost free end.

9. The machine of claim 5, wherein the confinement member has at least one of following features:
the confinement member is spaced by a distance to the lower portion of the gripping part in the range of 1.5 to 3 cm;
the confinement member has a lowermost end that is spaced by a distance to the connection member in the range of 0.5 to 5 cm;
the confinement member has a width in the range of 0.5 to 3 cm; and
the confinement member has a lowermost free end.

10. The machine of claim 1, wherein the container has a rim delimiting an opening of the container cavity, the machine further comprising a removable lid extending over the rim and having at least one of:
a) a peripheral wall that extends downwardly to form an outside lid face of the container, such as an outside lid face:
having a height in the range of 0.5 to 5 cm; and/or
extending flush with an outside face of the container uncovered by the lid and/or with an outside face of the base, and
b) an upright inner wall that extends downwardly into the cavity along the rim.

11. The machine of claim 10, wherein the peripheral wall has a bottom end that contacts or comes close to the connection member, the bottom end being optionally spaced by less than 1 cm from the connection member.

12. The machine of claim 1, wherein the container has at least one outside container wall that can be thermally conditioned by the liquid food substance in the cavity and/or by processing the liquid food substance in the cavity and that faces the at least one base wall when the container is in or on the base, and wherein the base and/or the container comprises one or more thermally insulating spacers, spacing the at least one base wall from the at least one outside container wall when the container is received in or on the seat of the base so as to prevent or inhibit thermal transfer between the at least one base wall and the container.

13. The machine of claim 12, wherein the container is configured to radiate heat to outside of the container or absorb heat from outside of the container predominantly via one or more preferential container walls, as the thermally radiating or absorbing element, when the liquid food substance is processed in the container received in or on the seat, the thermally insulating spacers being positioned so as to space the one or more preferential wall from the at least one base wall.

14. The machine of claim 12, wherein the insulating spacer is configured to space the at least one base wall from the at least one outside container wall by a distance in the range of 0.1 to 1 cm.

15. The machine of claim 1, wherein the food cavity contains a movable agitating device, to agitate the liquid food substance during its processing.

16. The machine of claim 1, wherein the processing device and/or the control system are contained in the base.

17. A machine for processing a liquid food substance, comprising:
a container that delimits a food cavity for containing the liquid food substance;
a base that has one or more walls forming a seat for removably receiving the container; and
the base and the container comprise, respectively, an off-centered, projecting member, and a corresponding off-centered seat for the projecting member or vice versa, the off-centered seat being configured to receive the projecting member when the container is received by the base such that the container is in a place for processing the liquid food substance in the food cavity, the off-centered projecting member being configured to maintain the container off the place for processing the liquid food substance in the cavity when the projecting member is off-set, relative to the off-centered seat,
wherein the container has at least one outside container wall that can be thermally conditioned by the liquid food substance in the cavity and/or by processing the liquid food substance in the cavity and that faces at least one base wall when the container is in or on a base seat, and wherein the base and/or the container comprises one or more thermally insulating spacers or an insulating layer, spacing the at least one base wall from the at least one outside container wall when the container is received in or on a seat of the base so as to prevent or inhibit thermal transfer between the at least one base wall and the at least one outside container wall of the container adjacent the at least one base wall.

18. The machine of claim 17, wherein the insulating spacer is configured to space the at least one base wall from the at least one outside container wall by a distance in the range of 0.3 to 0.8 cm.

19. The machine of claim 17, wherein the one or more preferential wall form a bottom wall of the container or a sidewall of the container or both.

20. The machine of claim 17, wherein the one or more thermally insulating spacers comprises ribs or protrusions.

* * * * *